Jan. 12, 1937.  E. SEIBOLD  2,067,209

HYDRAULIC TRANSMISSION

Original Filed Oct. 7, 1933  2 Sheets-Sheet 1

INVENTOR
ERNST SEIBOLD
BY C. P. Goepel
ATTORNEY

Jan. 12, 1937.  E. SEIBOLD  2,067,209
HYDRAULIC TRANSMISSION
Original Filed Oct. 7, 1933  2 Sheets-Sheet 2

INVENTOR
ERNST SEIBOLD
BY C. P. Goepel
ATTORNEY

Patented Jan. 12, 1937

2,067,209

UNITED STATES PATENT OFFICE 2,067,209

HYDRAULIC TRANSMISSION

Ernst Seibold, Heidenheim-on-the-Brenz, Germany, assignor to J. M. Voith, Heidenheim-on-the-Brenz, Germany, a partnership composed of Walther Voith, Hermann Voith, and Hans Voith Original application October 7, 1933, Serial No. 692,664. Divided and this application June 19, 1934, Serial No. 731,247. In Germany October 11, 1932

5 Claims. (Cl. 60—54)

This invention relates to hydraulic transmissions and methods for operating the same, and more particularly to improvements in such transmissions as are generally known as the Foettinger type. The invention finds application to power transmission devices, such as hydraulic slip couplings, hydraulic torque changers, and as well to hydraulic variable speed transmissions, and the like.

This application is a divisional of my copending application Serial No. 692,664, filed in the United States Patent Office on October 7, 1933.

As is known in the art, each one of the before-mentioned transmission devices consists generally of these parts,—a primary and a secondary shaft, one or more primary and secondary wheels, whereby in the case of the hydraulic variable speed transmission, an hydraulic slip coupling may be combined to form one unit with a torque changer. The operation for these units is made possible through the medium of a working fluid. This working fluid is supplied from a reservoir by a pump to the transmission.

One object of the invention is to arrange the reservoir which holds the supply of working fluid, in a position close to the pump which serves to supply the transmission with working fluid, and with the reservoir placed below the transmission to have the pump below the reservoir or below the liquid level of the reservoir. By this arrangement, the supply and return of oil can be effected in a very efficient manner.

A further object of this invention consists in providing means to make possible the equalization of pressure between the air spaces of the transmission and the reservoir, and preferably to so place the air vent as to avoid the loss of liquid. In the operation of devices of this kind, it has been shown that the liquid which passes to the reservoir always absorbs or entrains air. By this intermingling with air, a strong transposition of air from the transmission to the reservoir may take place, whereby an injurious under-pressure in the transmission and a corresponding over-pressure in the reservoir may result. These conditions are undesirable for many reasons, and are unavoidable, for instance, in such transmissions in which connecting conduits between the reservoir and the different parts of the transmission exist, particularly in such cases where the conduits, for certain reasons, terminate below the liquid level in the reservoir.

If then there is a lower pressure in the transmission and a higher pressure in the reservoir, by these pressures liquid is forced back into such parts of the transmission which are empty. Furthermore, such overpressure in the reservoir makes difficult the flow of the returning liquid from the filled parts of the transmission, which is equally undesirable and gives cause for disturbances.

All of these objections can be avoided by providing a pressure equalizer between the air chambers of the transmission and the reservoir. The simplest embodiment provides an air connection between the highest places of the transmission and the reservoir, and such an arrangement has produced an unexpected decrease in the loss inherent in the apparatus. Also, liquid losses from the reservoir are avoided due to the fact that pressure increase in the reservoir is avoided. Tests which have been made have demonstrated surprisingly favorable results from this improvement.

Preferably, the embodiment provides for the arrangement of the air connection at so high a position that liquid losses are avoided. Finally, when changing over from one part of the transmission to another part, it has been found that the discharge of air from the part to be filled with liquid and the inflow of air into the part to be emptied of the liquid, take place much more rapidly and more efficiently. To assist this operation, special air openings are provided for each part of the transmission, whereby an exceedingly rapid exchange of air between the transmission, the housing, and the casing, takes place.

These and further features of the invention will be hereinafter described, with the aid of the accompanying drawings; and the invention will be finally pointed out in the appended claims.

In the accompanying drawings:—

Similar characters of reference indicate corresponding parts throughout the various views.

Figure 1:
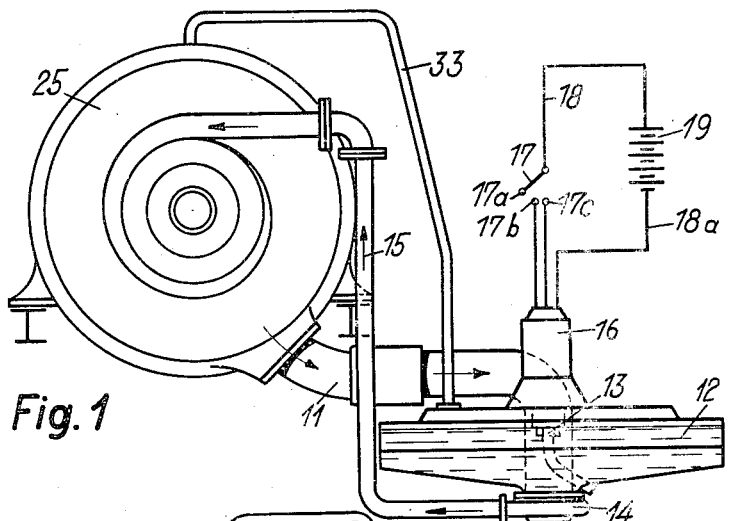
Figure 1 shows a side elevation of an hydraulic transmission in which the pump is at the lowest point of the liquid reservoir.

Referring now to Figure 1, the hydraulic transmission 25 is connected with the discharge conduit 11 which in turn is connected with the reservoir 12, the latter being provided with an overflow edge 13, and such edge 13 is lower than the lowest point of the operating parts of the transmission 25. At the lowest point of this reservoir 12, a supply pump 14 is provided, and this pump is connected with the hydraulic transmission 25 by means of the conduit 15. For a very efficient working of the parts described, an air-equalizing pipe 33 brings about communication of air between the transmission 25 and reservoir 12.

This arrangement is especially advantageous when operated in such a manner that during the starting period of the transmission the supply pump is driven with a higher number of revolutions than that necessary to keep the transmission filled when in normal operation. One obtains by this a short starting period. The necessary larger starting power of the supply pump is of no importance as it is required only for several seconds. In ordinary normal operation, the supply pump is required to run only with so small a number of revolutions as is necessary to maintain the transmission filled, and the power requirement in such a case is small. To obtain the above higher number of revolutions, in the simplest manner, the supply pump is driven by an electric motor 16 capable of running with at least two different speeds, and the switch 17 for this motor is correspondingly provided with at least two operating positions. These positions are so arranged that from the zero position 17a the position of high-speed revolution 17b must first be passed through, and only by further movement of the switch to position 17c, is the lower motor speed provided for normal operation obtained. The electric circuit is completed by conductors 18 and 18a and electrical source of supply 19. This electrical connection is described as a preferred form but is not essential to the invention herein claimed.

Particularly important are the advantages of this arrangement in hydraulic transmissions in which during the operation, the liquid is allowed to dissipate from one part of the transmission, whereby the same is emptied, and is supplied to another part of the transmission for the purpose of filling it. In such a case, one uses, on the pressure side of the supply pump, a multiple way valve, indicated by 32 in Fig. 3 and by 23 in Fig. 6, which connects piping either with the slip coupling or the torque changer parts of the transmission.

Figure 2:
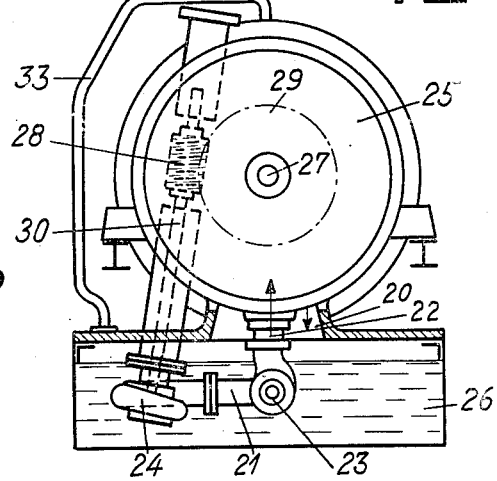
Figure 2 shows a side elevation partly in section, of another embodiment of my invention in which all of the essential operative parts are brought within a unitary container.

In the embodiment shown in Fig. 2, the transmission, the control valve and the supply pump are all assembled in the form of one unitary self-contained unit wherein the reservoir for the liquid is made of a very simple and inexpensive vessel and is fastened to the transmission in such a way that the pump, the control valve and all connections are enclosed by the reservoir container. In this embodiment shown in Fig. 2, the conducting parts 20, 21 and 22, the control valve 23, and the pump 24, are brought together in a unitary manner within the reservoir 26. The pump 24 is actuated by shaft 27 of the transmission by means of the worm 28 and the worm gear 29. Thus by the operation of shaft 27, and the rotation of the worm gear 29, the worm 28 and the shaft 30 are driven, whereby the pump 24 is operated, and the liquid forced through the conduits 20, 21 and 22 suitably controlled by the valve 23. The working fluid after having been pumped into the transmission through pipe 22, discharges at 20. It will be noted that all of these operating parts are within the reservoir 26 and that the parts are of the simplest construction. It will also be noted that the connection of the various conduits 20, 21 and 22 are within the liquid of the reservoir 26 so that no harm results from any leakage. To bring about a very efficient operation of the parts described, an air-equalizing pipe 33 connects the transmission and the reservoir, whereby the air pressure therein is equalized.

Figure 3:
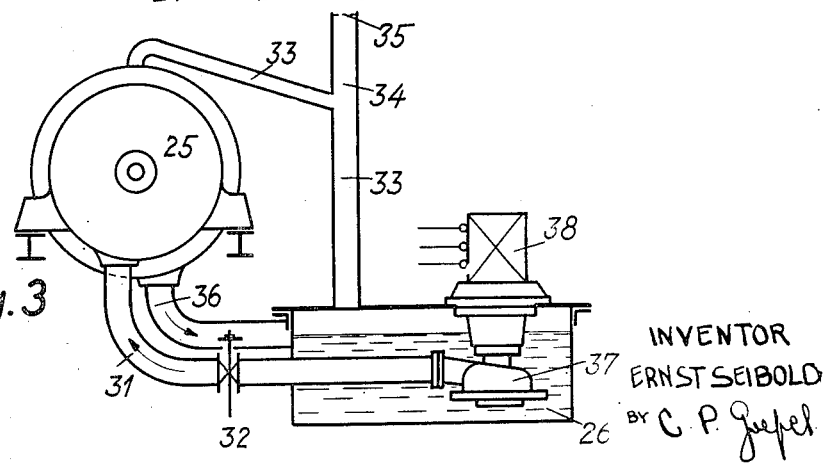
Figure 3 shows a side elevation partly in section in which the apparatus shown is provided with an air vent.

In the embodiment of Figure 3, a conduit 31 conducts operating liquid from the control valve 32 to the transmission 25. The air spaces of the transmission 25 and of the reservoir 26 are interconnected by an air pipe 33, which through a branch pipe 34 communicates with the atmosphere at its upper end 35, this end 35 being relatively high in respect to the other parts of the apparatus in order to avoid liquid losses. The liquid is returned from the transmission to the reservoir by pipe 36. The supply pump 37 is operated by the motor 38. In case the extension 34 be omitted the pipe 33 can be arranged as shown in Figs. 1 and 2.

Figure 4:
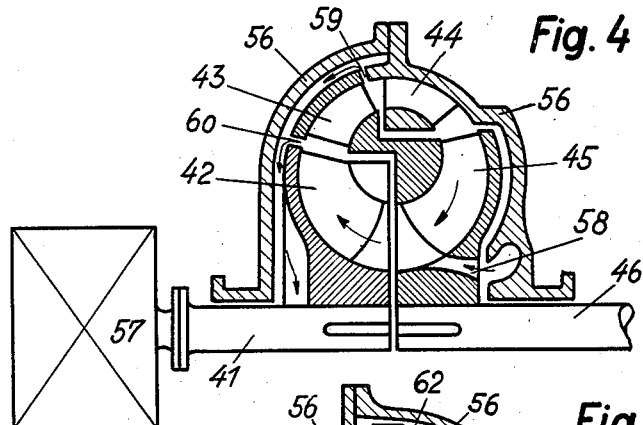
Figure 4 is a section of a torque changer.
Figure 5:
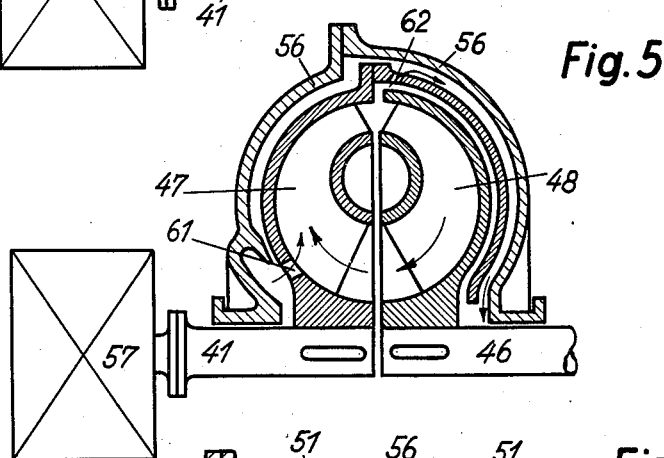
Figure 5 is a section of a slip coupling.
Figure 6:
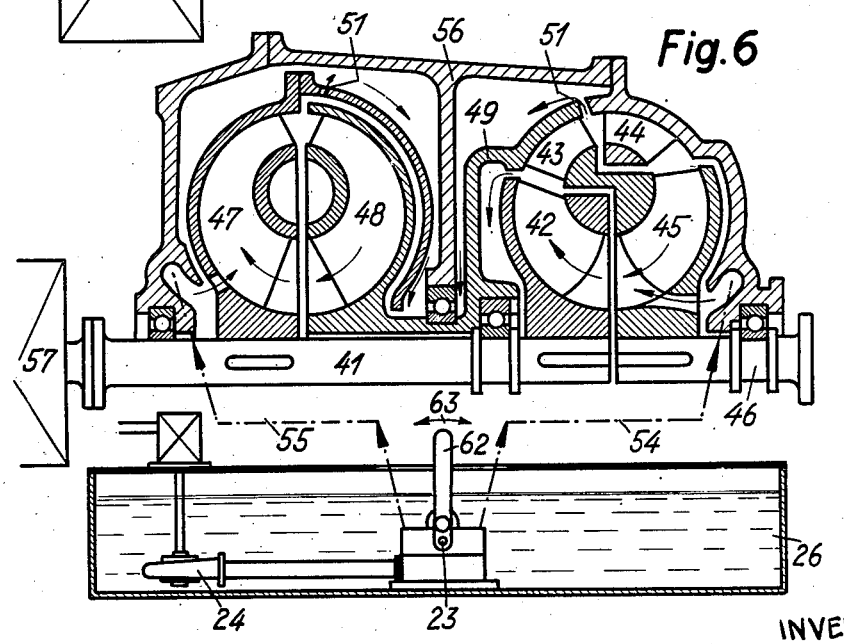
Figure 6 is a section of an hydraulic variable speed transmission composed of a torque changer, a slip coupling, and a reservoir for the working fluid.

The transmission shown in Figs. 1 to 3 may have either of the forms shown in Figs. 4 to 6. In Figure 4 is shown a section of a torque changer having a casing 56 in which a primary shaft 41 and secondary shaft 46 rotate, primary shaft 41 being rotated by the prime mover 57. On the primary shaft 41 is an impeller 42 fixed thereto. On the secondary shaft in fixed connection with same is a turbine runner having two stages 43 and 45. Between the two stages 43 and 45 is a fixed guide wheel 44, fixed to the housing 56. Working fluid is admitted to the torque changer through the opening 58 and the working fluid is discharged at 59 and 60.

In Figure 5 is shown a slip coupling in which the primary shaft 41 is secured to the impeller 47 and the secondary shaft 46 is secured to the turbine wheel 48. Inlet of the working fluid is shown at 61 and outlet for the same at 62.

In Fig. 6 is shown a combined torque changer and slip coupling. The torque changer as well as the slip coupling consists of substantially the same parts as the parts described in connection with Figs. 4 and 5. Below the structure shown in Fig. 6 is shown a reservoir 26 and pump 24. A control valve 23, has a handle 62, which may be turned in either direction as shown by the arrow 63, and the working fluid directed either in the direction 55 to the slip coupling or in the direction 54 to the torque changer. While Fig. 6 shows a reservoir, it is of course clear that a reservoir is used in Figs. 1 and 2, in which case a distributing valve is not necessary.

I have described several embodiments of my invention, but changes may be made therein without departing from the spirit or scope of the invention as defined in the appended claims.

I claim:—

1. In an hydraulic transmission which, by means of filling with or emptying of a working fluid, can be put into operation or put out of operation, respectively; a housing for the transmission, a pump for the working fluid, a motor for the pump, a reservoir for the working fluid the highest level of which is below the lowest point of the working fluid in the transmission, said reservoir being separate from and independent of said transmission housing the pump being at a lower elevation than the level of the working fluid in the reservoir, supply and return pipes to and from the transmission and the reservoir, and a stationary pipe connecting the air space in the uppermost part of the transmission housing with the air space in contact with the working fluid, in the reservoir for equalizing the pressure between said air spaces, said stationary pipe providing air communication continuously between the uppermost part of the transmission and the reservoir.

2. In an hydraulic transmission which, by means of filling with or emptying of a working fluid, can be put into operation or put out of operation, respectively; a housing for the transmission, a pump for the working fluid, a motor for the pump, a reservoir for the working fluid the highest level of which is below the lowest point of the working fluid in the transmission, said reservoir being separate from and independent of said transmission housing, the pump being at a lower elevation than the level of the working fluid in the reservoir, said pump being within the reservoir, supply and return pipes to and from the transmission and the reservoir, and a stationary pipe connecting the air space in the uppermost part of the transmission housing with the air space in contact with the working fluid, in the reservoir for equalizing the pressure between said air spaces, said stationary pipe providing air communication continuously between the uppermost part of the transmission and the reservoir.

3. In an hydraulic transmission which, by means of filling with or emptying of a working fluid, can be put into or put out of operation, respectively; a housing for the transmission, a pump for the working fluid, a motor for the pump, a reservoir for the working fluid the highest level of which is below the lowest point of the working fluid in the transmission, the pump being at a lower elevation than the level of the working fluid in the reservoir, supply and return pipes to and from the transmission and the reservoir, a stationary pipe connecting the air space in the uppermost part of the transmission housing with the air space in the reservoir for equalizing the pressure between said air spaces, said stationary pipe providing air communication continuously between the uppermost part of the transmission and the reservoir, and means in said last-named pipe having an opening in communication with the outside atmosphere at a plane which does not permit any liquid loss through said opening.

4. In an hydraulic transmission which, by means of filling with or emptying of a working fluid, can be put into operation or put out of operation, respectively; a housing for the transmission, a pump for the working fluid, a motor for the pump, a reservoir for the working fluid the highest level of which is below the lowest point of the working fluid in the transmission, said reservoir being separate from and independent of said transmission housing, the pump being at a lower elevation than the level of the working fluid in the reservoir, supply and return pipes to and from the transmission and the reservoir, the transmission and reservoir being built as a unit and said reservoir enclosing said pump and pipes, a primary shaft, a driving mechanism between the primary shaft and the supply pump for effecting the operation of the supply pump upon the actuation of the primary shaft, and a stationary pipe connecting the air space in the uppermost part of the transmission housing with the air space in contact with the working fluid, in the reservoir for equalizing the pressure between said air spaces, said stationary pipe providing unrestricted air communication continuously between the uppermost part of the transmission and the reservoir.

5. In an hydraulic transmission which, by means of filling with or emptying of a working fluid, can be put into operation or put out of operation, respectively; a housing for the transmission, a pump for the working fluid a motor for the pump, a reservoir for the working fluid, said reservoir being separate from the transmission housing, supply and return pipes to and from the transmission and reservoir, and a stationary pipe connecting the air space in the uppermost part of the transmission housing with the air space in contact with the working fluid in the reservoir for equalizing the pressure between said air spaces, said stationary pipe providing unrestricted air communication continuously between the uppermost part of the transmission and the reservoir.

ERNST SEIBOLD.